(12) United States Patent
Kim (10) Patent No.: US 6,987,893 B2
(45) Date of Patent: Jan. 17, 2006

(54) IMAGE INTERPOLATION METHOD AND APPARATUS THEREOF

(75) Inventor: Sang Yeon Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 683 days.

(21) Appl. No.: 10/035,252

(22) Filed: Jan. 4, 2002

(65) Prior Publication Data

US 2002/0126900 A1  Sep. 12, 2002

(30) Foreign Application Priority Data

Jan. 5, 2001 (KR) ............................ 2001-0000606
Jan. 22, 2001 (KR) ............................ 2001-0000607

(51) Int. Cl.
*K06K 9/32* (2006.01)
(52) U.S. Cl. ...................... 382/300; 382/199; 382/266; 358/525; 358/3.27
(58) Field of Classification Search ................ 382/252, 382/260, 263, 266, 269, 274, 275, 300, 199; 358/3.26, 3.27, 463, 3.14, 525
See application file for complete search history.

(56) References Cited

U.S. PATENT DOCUMENTS

| | | | | |
|---|---|---|---|---|
| 4,571,632 A | * | 2/1986 | Schaphorst et al. | 358/426.01 |
| 4,906,097 A | * | 3/1990 | Wiedemann | 356/615 |
| 5,742,354 A | * | 4/1998 | Vlahos et al. | 348/586 |
| 5,937,147 A | * | 8/1999 | Ng | 358/1.9 |
| 6,381,035 B1 | * | 4/2002 | Zhang et al. | 358/1.9 |
| 6,421,090 B1 | * | 7/2002 | Jiang et al. | 348/452 |
| 6,535,221 B1 | * | 3/2003 | Allen et al. | 345/611 |
| 6,628,330 B1 | * | 9/2003 | Lin | 348/252 |

OTHER PUBLICATIONS

"Edge-Directed Interpolation" by Jan Allebach et al., 0-7803-3258X/96 IEEE, vol. 3 1996, pp. 707-710.
"New Edge Directed Interpolation" by Xin Li et al., International Conference on Image Processing, 0-7803-6297-7/00 IEEE, vol. 2, 2000, pp. 311-314.

* cited by examiner

Primary Examiner—Sanjiv Shah
Assistant Examiner—Yosef Kassa
(74) Attorney, Agent, or Firm—Birch Stewart Kolasch & Birch LLP (57) ABSTRACT

Disclosed is an image interpolation method and apparatus thereof. The present invention includes the steps of searching an edge direction to be used for interpolation by a pixel matching using input pixels and generating a pixel to be substantially interpolated by referring to pixels located on the searched edge direction. The present invention includes the steps of carrying out a first interpolation on input pixels using linear interpolation and finding weighted value coefficients in accordance with a relationship between the first interpolated pixel and the adjacent input pixels to be used for interpolation and preparing a pixel to be substantially interpolated by adaptive weighted interpolation applying the found weighted value coefficient to the adjacent input pixels. Accordingly, the present invention minimizes the blurring and is free of geometrical distortion.

17 Claims, 5 Drawing Sheets

IMAGE INTERPOLATION METHOD AND APPARATUS THEREOF

BACKGROUND OF THE INVENTION

1. Field of the Invention

The present invention relates to a digital image interpolation, and more particularly, to an image interpolation method and apparatus thereof enabling to provide an interpolated image of high definition.

2. Background of the Related Art

Generally, interpolation of a image signal is a process of generating large-sized image data from small-sized data, which is applicable to various applied fields of home appliances such as digital TV, camcorder, and the like as well as PC application software, image analyzing system, and the like. Simple interpolation includes an interpolation through linear filtering, bi-linear interpolation, bi-cubic interpolation, and the like. Yet, such interpolations fail to settle the blurring of edge as a basic problem in image interpolation so far.

Edge-directed interpolation by finding an edge of an image is proposed by the following.

[1] J. Allebach and P. W. Wong, "Edge-directed interpolation", international conference or, image processing'96, vol. 3, pp. 707–710, 1996.

[2] X. Li and M. T. Orchard, "New edge-directed interpolation", international conference on image processing'2000, vol. 2, pp. 311–314, 2000.

However, the interpolation in [1] includes the steps of providing an edge map in an image of low resolution, transforming the provided edge map into a map of high resolution, and carrying out rendering and correction using the attained edge map, thereby requiring lots of calculation. Meanwhile, the interpolation in [2] is to reduce lots of calculation in the interpolation in [1], which includes the steps of finding a local statistical characteristic of an image and finding an interpolation filter coefficient using the found characteristic. Yet, the interpolation in [2] requires lots of calculation in finding the statistical characteristic and filter coefficient as well. Moreover, when an estimated direction of the edge is wrong due to a noise existing in the image or the like, geometric distortion occurs in the interpolated image.

SUMMARY OF THE INVENTION

Accordingly, the present invention is directed to an image interpolation method and apparatus thereof that substantially obviates one or more problems due to limitations and disadvantages of the related art.

An object of the present invention is to provide an image interpolation method and apparatus thereof enabling to minimize the blurring by interpolating an image by means of estimating precisely an edge direction of an image and using information of the estimated edge direction.

Another object of the present invention is to provide an image interpolation method and apparatus thereof enabling to minimize the blurring and be free of geometrical distortion by carrying an interpolation by a linear interpolation and then carrying out an adaptive weighted interpolation using the interpolated result.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image interpolating method according to an aspect of the present invention includes a step (a) of searching an edge direction to be used for interpolation by a pixel matching using input pixels and a step (b) of generating a pixel to be substantially interpolated by referring to pixels located on the searched edge direction.

Preferably, according to an aspect of the invention the step (a) determines the edge direction as 0° direction at a flat region having a less variation of a signal and a texture part having a severe variation of the signal.

Preferably, according to an aspect of the invention the step (a) measures an error of each of the edge directions using a measurement function and determines a direction having a minimum error value of the errors as a final edge direction.

Preferably, according to an aspect of the invention the step (a) searches the edge direction having a minimum error by matching pixels located at upper and lower lines of a pixel to be interpolated for a vertical interpolation.

More preferably, according to an aspect of the invention the step (a) outputs a relative horizontal coordinate as a result of a vertical pixel matching in accordance with the searched edge direction.

Preferably, according to an aspect of the invention the step (a) searches the edge direction having a minimum error by matching pixels located at right and left to a pixel to be interpolated for a horizontal interpolation.

More preferably, according to an aspect of the invention the step (a) outputs a relative vertical coordinate as a result of a horizontal pixel matching in accordance with the searched edge direction.

Preferably, according to an aspect of the invention the edge direction search and interpolation in the steps (a) and (b) are carried out independently in vertical and horizontal directions, respectively.

Preferably, according to an aspect of the invention when an input image is interpolated into various multiples, and when a crossing location between the extended line along the determined edge direction from the location of the pixel to be substantially interpolated and horizontal (vertical) line in case of vertical (horizontal) interpolation fails to coincide with a location of an original sample, the step (b) includes further steps of preparing interpolation pixels in a horizontal direction by referring to a plurality of pixels adjacent to the crossing in the same edge direction and preparing the pixel to be substantially interpolated by referring to the horizontally interpolated pixels.

In another aspect of the present invention, an image interpolating apparatus includes a vertical interpolation unit searching a vertical edge direction by a pixel matching using input pixels and carrying out a vertical interpolation filtering in the searched edge direction and a horizontal interpolation unit searching a horizontal edge direction by the pixel matching using the input pixels and carrying out a horizontal interpolation filtering in the searched edge direction, wherein the vertical and horizontal interpolation units have structures independent from each other.

Preferably, according to an aspect of the invention the vertical interpolation unit includes a vertical pixel matching unit determining the edge direction having a minimum error by matching pixels located at upper and lower lines of a pixel to be interpolated using a measurement function and outputting a relative horizontal coordinate as a result of a vertical pixel matching in accordance with the determined edge direction and a vertical interpolation filter unit carrying out an interpolation in a vertical direction using the input pixels, 1-line-delayed pixel, and pixels located at the relative horizontal coordinate of the vertical pixel matching unit.

Preferably, according to an aspect of the invention the horizontal interpolation unit includes a horizontal pixel matching unit determining the edge direction having a minimum error by matching pixels located at right and left to a pixel to be interpolated using a measurement function and outputting a relative vertical coordinate as a result of a horizontal pixel matching in accordance with the determined edge direction and a horizontal interpolation filter unit carrying out an interpolation in a horizontal direction using the input pixels, a plurality of pixels delayed sequentially by line delay units respectively through a plurality of line memories, and pixels located at the relative vertical coordinate of the horizontal pixel matching unit.

In a further aspect of the present invention, an image interpolating method includes a step (a) of carrying out a first interpolation on input pixels using linear interpolation and a step (b) of finding a weighted value coefficient in accordance with a relationship between the first interpolated pixel and the adjacent input pixels to be used for interpolation and preparing a pixel to be substantially interpolated by adaptive weighted interpolation applying the found weighted value coefficient to the adjacent input pixels.

Preferably, according to an aspect of the invention the step (a) carries out the first interpolation on the input pixels using bilinear interpolation.

In another further aspect of the present invention, an image interpolating apparatus includes a linear interpolation unit carrying out a first interpolation on input pixels and an adaptive weighted interpolation unit finding weighted value coefficients in accordance with a relationship between the first interpolated pixel of the linear interpolation unit and the adjacent input pixels used for interpolation and preparing a pixel to be substantially interpolated by adaptive weighted interpolation applying the found weighted value coefficient to the adjacent input pixels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Method and apparatus for interpolation enabling to minimize a blurring are explained according to first and second embodiments of the present invention.

The first embodiment of the present invention is characterized in that an edge direction of an image is precisely estimated and that the image is interpolated using information of the estimated edge direction. And, the second embodiment of the present invention is characterized in that an image is interpolated by linear interpolation and that adaptive weighted interpolation is then carried out using the interpolation result.

First Embodiment

Figure 1A:
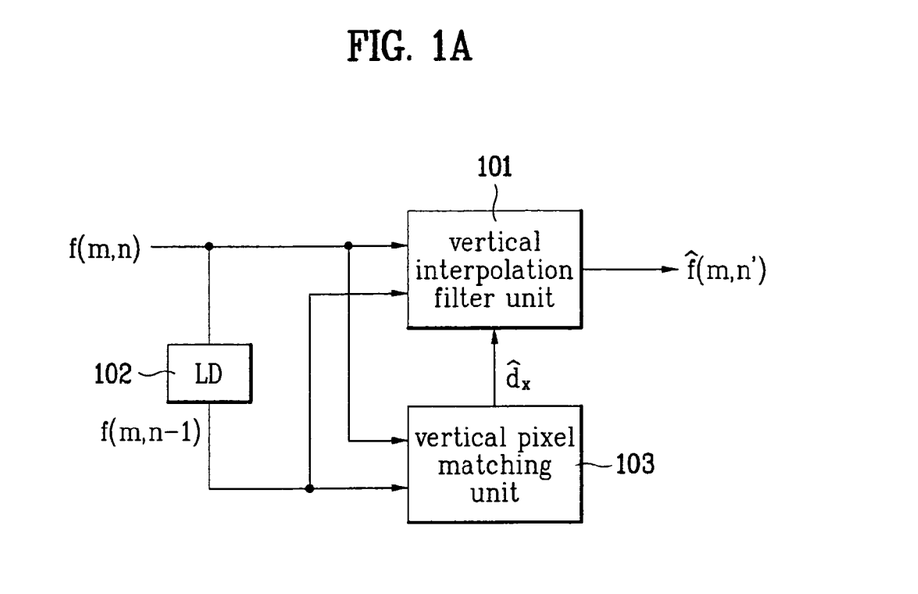
FIG. 1A illustrates a block diagram of an apparatus for interpolating an image in a vertical direction according to a first embodiment of the present invention.
Figure 1B:
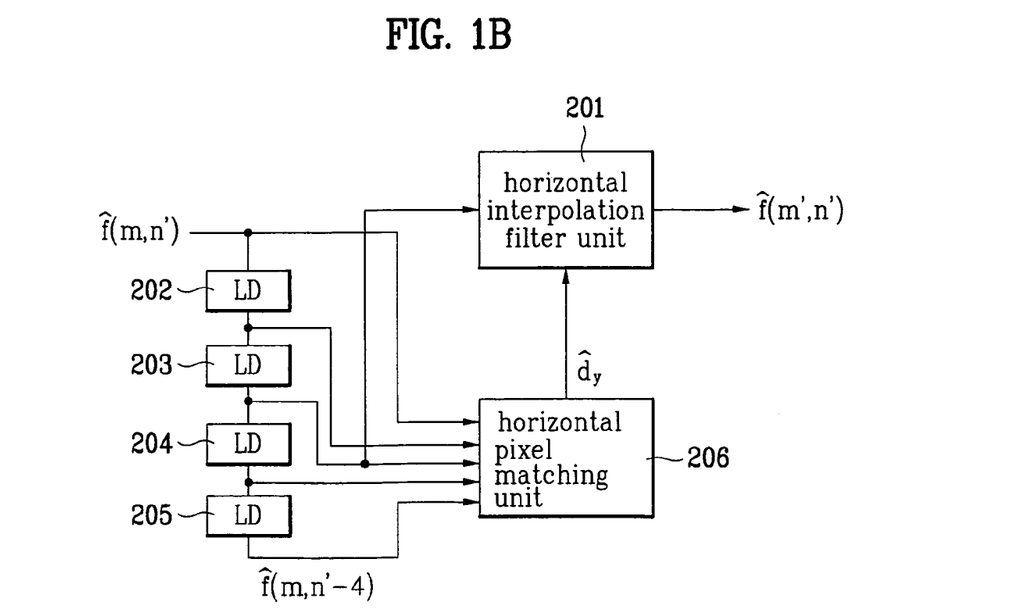
FIG. 1B illustrates a block diagram of an apparatus for interpolating an image in a horizontal direction according to a first embodiment of the present invention.

FIG. 1A illustrates a block diagram of an apparatus for vertical image interpolation according to a first embodiment of the present invention, and FIG. 1B illustrates a block diagram of an apparatus for horizontal image interpolation according to a first embodiment of the present invention. Namely, vertical interpolation and horizontal interpolation are carried out independently. In this case, an interpolating process in each direction includes an edge direction searching step by pixel matching and an interpolation filtering step in a searched direction.

Referring to FIG. 1A, a vertical-directed interpolation apparatus according to a first embodiment of the present invention includes a line memory 102 delaying an input signal by one line, a vertical pixel matching unit 103 finding an edge direction having a minimum error by matching the input signal with the 1-line-delayed signals from the line memory 102, and a vertical interpolation filter unit 101 interpolating the input signal in the edge direction having the minimum error detected in the vertical pixel matching unit 103.

Referring to FIG. 1B, a horizontal interpolation apparatus according to a first embodiment of the present invention includes first to fourth line memories 202 to 205 constructed with a plurality of sequentially-connected delay elements so as to delay an input signal by line unit, a horizontal pixel matching unit 206 finding an edge direction having a minimum error by matching the input signal with the signals outputted respectively from the first to fourth memories 202 to 205, and a horizontal interpolation filter unit 201 interpolating the input signal in the edge direction having the minimum error detected in the horizontal pixel matching unit 206.

The above-constructed first embodiment of the present invention explains vertical interpolation as follows.

If an input signal having low resolution is f(m,n), the input signal f(m,n) is delayed in the line memory 102 by one line and then outputted to the vertical pixel matching unit 103.

The vertical pixel matching unit 103 finds the edge direction having the minimum error by matching pixels located at lines n−1 and n above and below the pixel to be interpolated. Namely, the vertical pixel matching unit 103 receives the input signal f(m,n) and the one-line-delayed signal f(m,n−1), and then detects the edge direction having the minimum error.

Figure 2A:
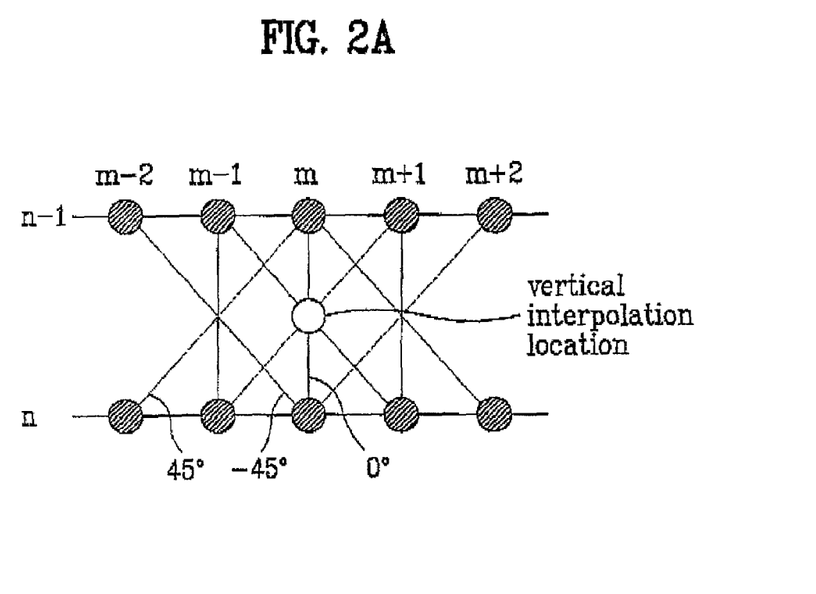
FIG. 2A illustrates a diagram of an example for a vertical pixel matching in FIG. 1A.

For instance, when six pixels respectively at the above and below are used, as shown in FIG. 2A, three edge directions(−45°, 0°, 45° centering around a vertical axis) are searched.

In this case, one of MAE(mean absolute error), MSE (mean square error), and cross correlation functions may be used as a measurement function of the search.

For instance, when the MAE function is used as the measurement function for the search, errors in the respective edge directions can be found through the following Formula 1.

[Formula 1]

$$mae_{-45°} = \sum_{i=-1}^{1} |f(m-1+i, n-1) - f(m+1+i, n)|$$

-continued $$mae_{0°} = \sum_{i=-1}^{1} |f(m+i, n-1) - f(m+i, n)|$$

$$mae_{45°} = \sum_{i=-1}^{1} |f(m+1+i, n-1) - f(m-1+i, n)|$$

In this case, a direction having the minimum error may be determined as the edge direction, in which the following two items should be considered with priority.

First, the edge direction is preferably determined as 0° direction in a flat region having a small variation of a signal, if at all possible. This is because the direction found in the flat region is mainly brought up by a noise and because a blurring artifact does not occur in the flat region despite linear interpolation (0°-directed interpolation).

Second, estimation of the edge direction becomes wrong with ease due to the aperture in a texture region having an extreme variation, whereby the edge direction is preferably determined as 0° direction.

Considering the above two items, the following Formula 2 may determine the edge direction.

[Formula 2]

$$\text{edge\_direction} = \underset{\theta \in \{-45°, 0°, 45°\}}{\arg} \min\{mae_{-45°}, \gamma \times mae_{0°}, mae_{45°}\}, \text{ where } \gamma$$

is greater than 0 and less than 1 and preferably about 0.8. This value is multiplied by 0° error function so as to determine the edge direction as the 0° direction as far as possible. As three error measure functions have almost similar values in the flat region, the edge direction is mostly determined as 0° by the value of γ. Moreover, when the edge in the texture region or in the horizontal direction exists, it is easily recognized that the minimum error value is relatively large. In this case, the edge direction is also determined as 0° since the estimated edge direction is not reliable.

Namely, considering the above conditions, the following Formula 3 determines the edge direction.

[Formula 3]

$$\text{edge\_direction} = \begin{cases} \underset{\theta \in \{-45°, 0°, 45°\}}{\arg} \min\{mae_{-45°}, \gamma \times mae_{0°}, mae_{45°}\}, & \text{when } \min\_error < T \\ 0°, & \text{otherwise} \end{cases}$$

where min_error=min{$mae_{-45°}$, γ×$mae_{0°}$, $mae_{45°}$}, and T as a value of representing a threshold value is preferably 180, as shown in FIG. 2A, when three pixels are matched.

A final output of the vertical pixel matching unit 103 is a relative horizontal coordinate in accordance with the edge direction, which is outputted as the following Formula 4.

[Formula 4]

$$\hat{d}_x = \begin{cases} -1, & \text{when edge\_direction} = -45° \\ 0, & \text{when edge\_direction} = 0° \\ 1, & \text{when edge\_direction} = 45° \end{cases}$$

When interpolating twice in the vertical direction using this result, the vertical interpolation filter 101 carries out a vertical-directed interpolation filtering by performing an operation like the following Formula 5 in accordance with the input signal f(m,n), output signal f(m,n−1) of the line memory 102, and the vertical pixel matching result $\hat{d}_x$.

[Formula 5]

$$\hat{f}(m, n') = \begin{cases} f\left(m, \dfrac{n'}{2}\right), & \text{for even values of } n' \\ \dfrac{f\left(m + \hat{d}_x, \dfrac{n'-1}{2}\right) + f\left(m - \hat{d}_x, \dfrac{n'+1}{2}\right)}{2}, & \text{for odd values of } n' \end{cases}$$

Figure 3:
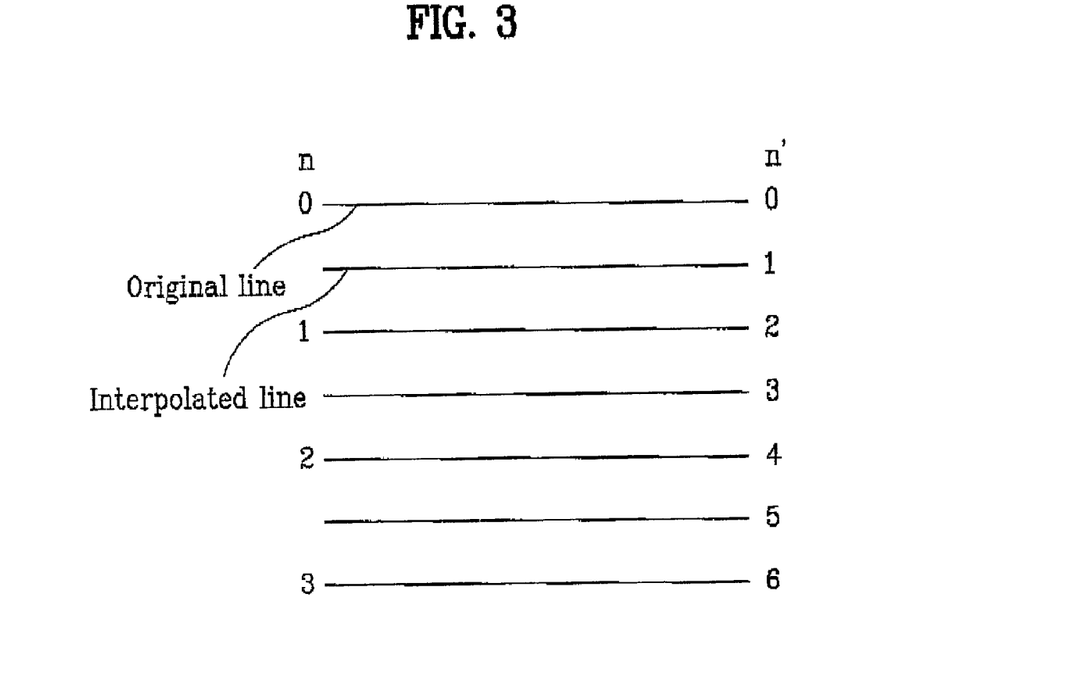
FIG. 3 illustrates a diagram of a relation between "n" and "n'" when interpolating twice in a vertical direction in FIG. 1A.

A relation between n and n' in Formula 5 is shown in FIG. 3. Namely, n is an index representing a location of each original pixel, and n' is an index representing a location of each pixel after interpolation in a vertical direction.

Meanwhile, an interpolation in a horizontal direction is carried out by the same method of the interpolation in the vertical direction.

Figure 2B:
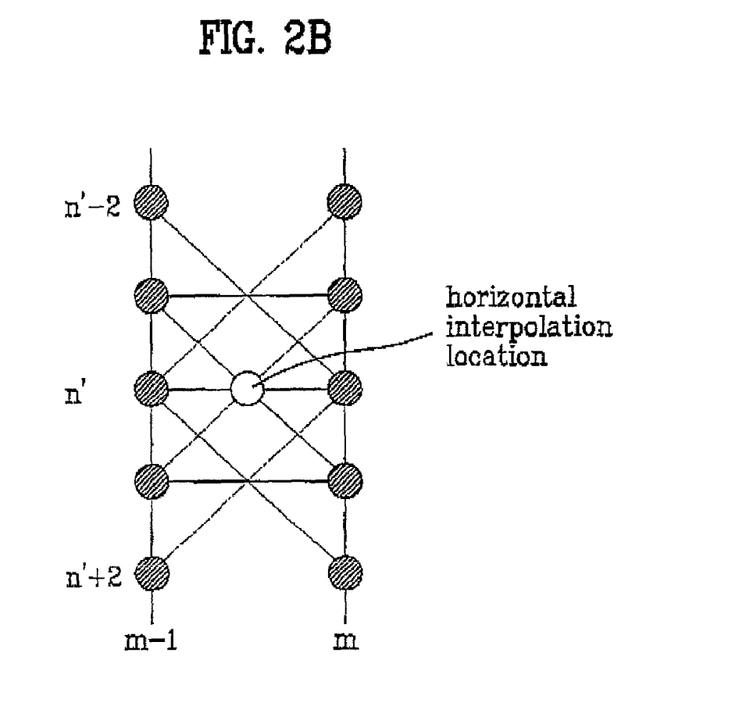
FIG. 2B illustrates a diagram of an example for a horizontal pixel matching in FIG. 1B.

Namely, a signal ĝ(m,n') interpolated in a vertical direction is delayed sequentially by line unit through the first to fourth line memories 202 to 205, and then outputted to the horizontal pixel matching unit 206 respectively. The horizontal pixel matching unit 206 receives the signal ĝ(m,n') interpolated in a vertical direction and the signals outputted respectively through the first to fourth line memories 202 to 205, and then carry out a horizontal pixel matching. For instance, the horizontal pixel matching unit 206 carries out the horizontal pixel matching using the pixels in FIG. 2B so as to output the result to the horizontal interpolation filter 201. The horizontal interpolation filter 201 carries out a horizontal-directed interpolation filtering like the following Formula 6 in accordance with the horizontal pixel matching result and the output of the second line memory 203.

[Formula 6]

$$\hat{f}(m, n') = \begin{cases} \hat{f}(m, n'), & \text{when } m' \text{ is even number} \\ \left[\hat{f}\left(\dfrac{m'-1}{2}, n' + \hat{d}_y\right) + \hat{f}\left(\dfrac{m'+1}{2}, n' - \hat{d}_y\right)\right]/2, & \text{when } m' \text{ is odd number} \end{cases}$$

The above process is carried out repeatedly so as to attain a $2^i$ (I=1, 2, . . . ) times interpolated image.

Figure 4:
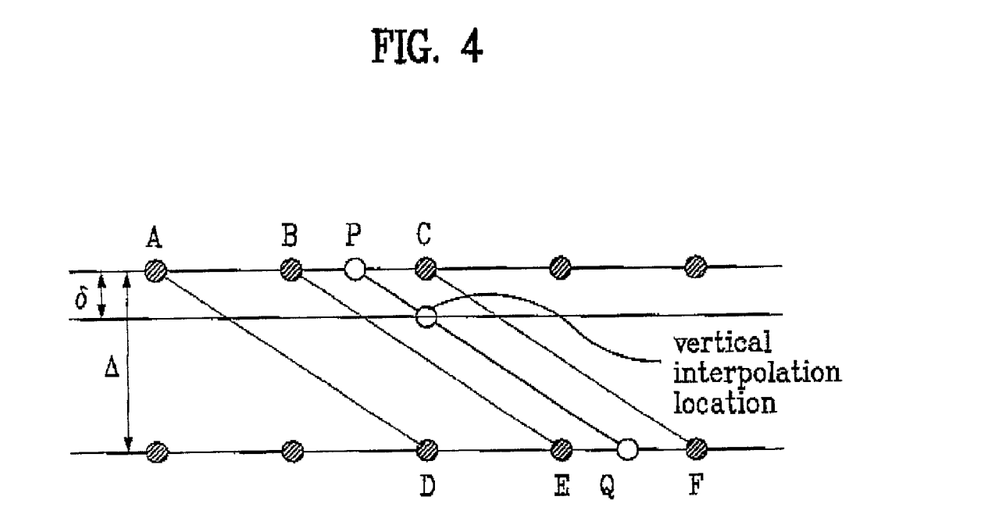
FIG. 4 illustrates a diagram of a vertical pixel matching and interpolation for an arbitrary position according to a first embodiment of the present invention.

Yet, an applied field generally requires various magnification ratios. In this case, a location of the pixel to be interpolated is not, exactly located at a center of the original sample. The edge direction in FIG. 4 is −45°, and a vertical location of the pixel to be interpolated fails to lie at the center between two lines. In this case, a straight line having a slope of −45° through the pixel to be interpolated passes a pixel P and a pixel Q. Therefore, the interpolation is carried out by substituting the pixels P and Q into Formula 5.

Yet, the two pixels P and Q are not the location of the original sample, thereby requiring horizontal interpolation like the following Formula 7 and Formula 8.

$$P = \begin{cases} \dfrac{2\delta}{\Delta}B + \left(1 - \dfrac{2\delta}{\Delta}\right)C, & \text{when } 0 \le \dfrac{2\delta}{\Delta} < 1 \\ \left(\dfrac{2\delta}{\Delta} - 1\right)A + \left(2 - \dfrac{2\delta}{\Delta}\right)B, & \text{when } 1 \le \dfrac{2\delta}{\Delta} < 2 \end{cases} \quad \text{[Formula 7]}$$

$$Q = \begin{cases} \dfrac{2\delta}{\Delta}E + \left(1 - \dfrac{2\delta}{\Delta}\right)F, & \text{when } 0 \le \dfrac{2\delta}{\Delta} < 1 \\ \left(\dfrac{2\delta}{\Delta} - 1\right)D + \left(2 - \dfrac{2\delta}{\Delta}\right)E, & \text{when } 1 \le \dfrac{2\delta}{\Delta} < 2 \end{cases} \quad \text{[Formula 8]}$$

In Formula 7 and Formula 8, δ is a vertical distance from an upper line to a location to be interpolated, and Δ is a distance between two lines in a vertical direction before the interpolation.

When the pixels P and Q are interpolated using Formula 7 and Formula 8, a vertical-directed interpolation filtering is carries out using the pixels P and Q.

Namely, a location of a line, which crosses with an extension line from a location of a pixel to be substantially interpolated toward a detected edge direction, fails to coincide with a location of the original sample. Hence, an interpolation pixel is newly generated in a horizontal direction using two pixels adjacent to the crossing, and then a wanted pixel is made using the interpolation pixel. For instance, in the vertical-edged interpolation, Formula 7 is an equation to make the interpolation pixel in a horizontal direction at the upper line n−1 used for the vertical interpolation, while Formula 8 is an equation to make the interpolation pixel in a horizontal direction at the lower line n used for the vertical interpolation.

Besides, the same method may be applicable to the horizontal interpolation.

Accordingly, the first embodiment of the present invention improves greatly the blurring at the edge part of an image using the edge direction search by the above pixel matching and the edge-directed interpolation filtering. Moreover, the first embodiment of the present invention, compared to the previous edge-directed interpolations according to the related art, requires less cost and calculation. Therefore, the product using the present invention has economical cost of product and excellent quality of interpolated image, thereby improving its competitiveness.

Second Embodiment

Figure 5:
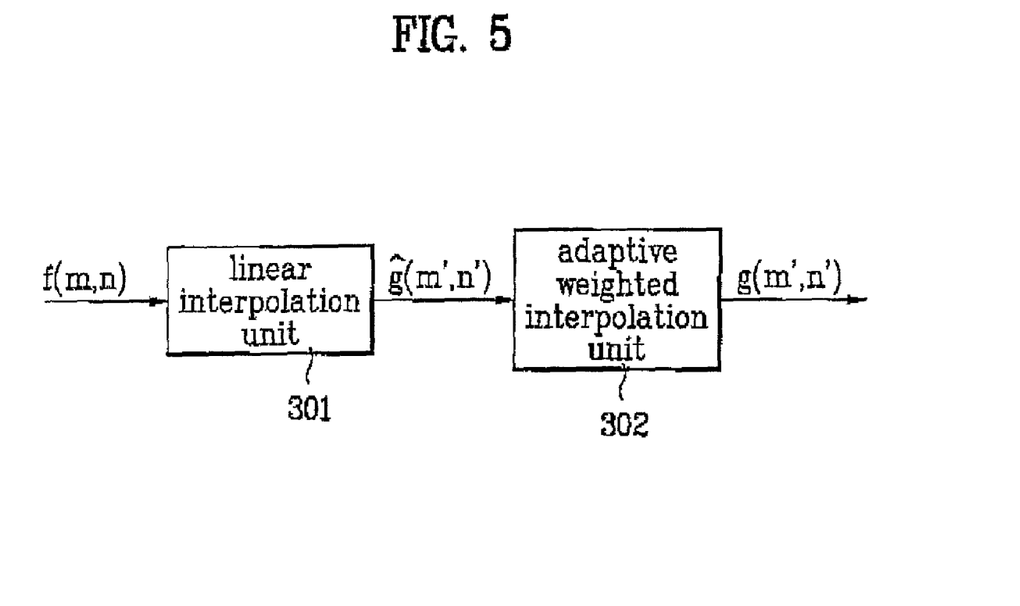
FIG. 5 illustrates a block diagram of an image interpolating apparatus according to a second embodiment of the present invention.

FIG. 5 illustrates a block diagram of an image interpolating apparatus according to a second embodiment of the present invention, in which two-stepped interpolation is carried out.

Referring to FIG. 5, an image interpolating apparatus includes a linear interpolation unit 301 carrying out a first interpolation and an adaptive weighted interpolation unit 302 carrying out a second interpolation using an output of the linear interpolation unit 301. In this case, the linear interpolation unit 301 gives a weighted value in proportion to an interpolating distance, while the adaptive weighted interpolation unit 302 gives a weighted value in proportion to a first interpolated pixel and adjacent pixel values.

In the above-constructed second embodiment of the present invention, the linear interpolation unit 301 finds a first interpolation data of an input signal using general linear interpolation, while the adaptive weighted interpolation unit 302 carries out adaptive weighted interpolation so as to find a second interpolation data using the first interpolation data and adjacent pixels.

In this case, the linear interpolation unit 301 may use a filter using a plurality of tabs. And, the embodiment of the present invention carries out the first interpolation using bi-linear interpolation.

Figure 6:
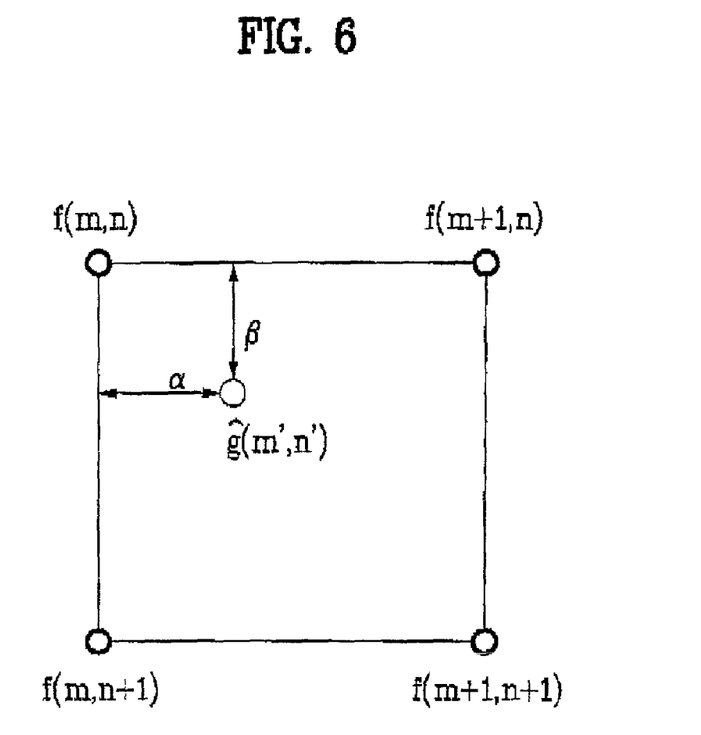
FIG. 6 illustrates a diagram for explaining bilinear interpolation carried out in a linear interpolation unit in FIG. 5.

FIG. 6 illustrates a diagram for explaining bi-linear interpolation carried out in a linear interpolation unit in FIG. 5.

Referring to FIG. 6, if a distance between horizontal and vertical adjacent pixels of an input image data is '1', the linear interpolation unit 301 carries out bi-linear interpolation like the following Formula 9 when data interpolation is carried out on a location distant as far as α and β in a horizontal direction and a vertical direction, respectively from a pixel having a location (m,n) like FIG. 6.

[Formula 9]

$$\hat{g}(m',n')=(1-\alpha)\cdot(1-\beta)f(m,n)+\alpha\cdot(1-\beta)\cdot f(m+1,n)+(1-\alpha)\cdot\beta\cdot f(m,n+1)+\alpha\cdot\beta\cdot f(m+1,n+1),$$

where $0 \leq \alpha < 1$ and $0 \leq \beta < 1$

In Formula 9, as α increases, the weighted values for pixels f(m,n) and f(m,n+1) decrease but those for pixels f(m+1,n) and f(m+1,n+1) increase. Moreover, as β increases, the weighted values for pixels f(m,n) and f(m+1, n) decrease but those for pixels f(m,n+1) and f(m+1,n+1) increase.

The adaptive weighted interpolation unit 302 finds weighted coefficients again using the bi-linear interpolation result in Formula 9 and, adjacent pixels, and then caries out interpolation using the weighted coefficients.

Namely, an interpolation equation of the adaptive weighted interpolation unit 302 becomes a weighted sum of four or two adjacent pixels like cases in Formulas 10 to Formulas 13.

[Formula 10]

i) case 1 (α≠0,β≠0)

$g(m',n')=w_{11}\cdot f(m,n)+w_{12}\cdot f(m+1,n)+w_{21}\cdot f(m,n+1)+w_{22}\cdot f(m+1,n+1)$ {Formula 11} ii) case 2 (α=0,β≠0)

$g(m',n')=w_{11}\cdot f(m,n)+w_{21}\cdot f(m,n+1)$

[Formula 12]

iii) case 3 (α≠0,β=0)

$g(m',n')=w_{11}\cdot f(m,n)+w_{12}\cdot f(m+1,n)$

[Formula 13]

ix) case 4 (α=0,β=0)

$g(m',n')=f(m,n)$

And, Formula 14 determines the weighted values as follows.

$$w_{11} = \frac{C}{\{f(m,n)-\hat{g}(m',n')\}^2 + \varepsilon^2}$$ [Formula 14]

$$w_{12} = \frac{C}{\{f(m+1,n)-\hat{g}(m',n')\}^2 + \varepsilon^2}$$

$$w_{21} = \frac{C}{\{f(m,n+1)-\hat{g}(m',n')\}^2 + \varepsilon^2}$$

$$w_{22} = \frac{C}{\{f(m+1,n+1)-\hat{g}(m',n')\}^2 + \varepsilon^2}$$

In this case, $2^2$ relating to energy of a noise is preferably about 10 and C is a normalization constant.

Namely, $$C = \frac{1}{w_{11}+w_{12}+w_{21}+w_{22}}$$

for the case 1, $$C = \frac{1}{w_{11}+w_{21}}$$

for the case 2, and $$C = \frac{1}{w_{11}+w_{12}}$$

for the case 3.

Figure 7:
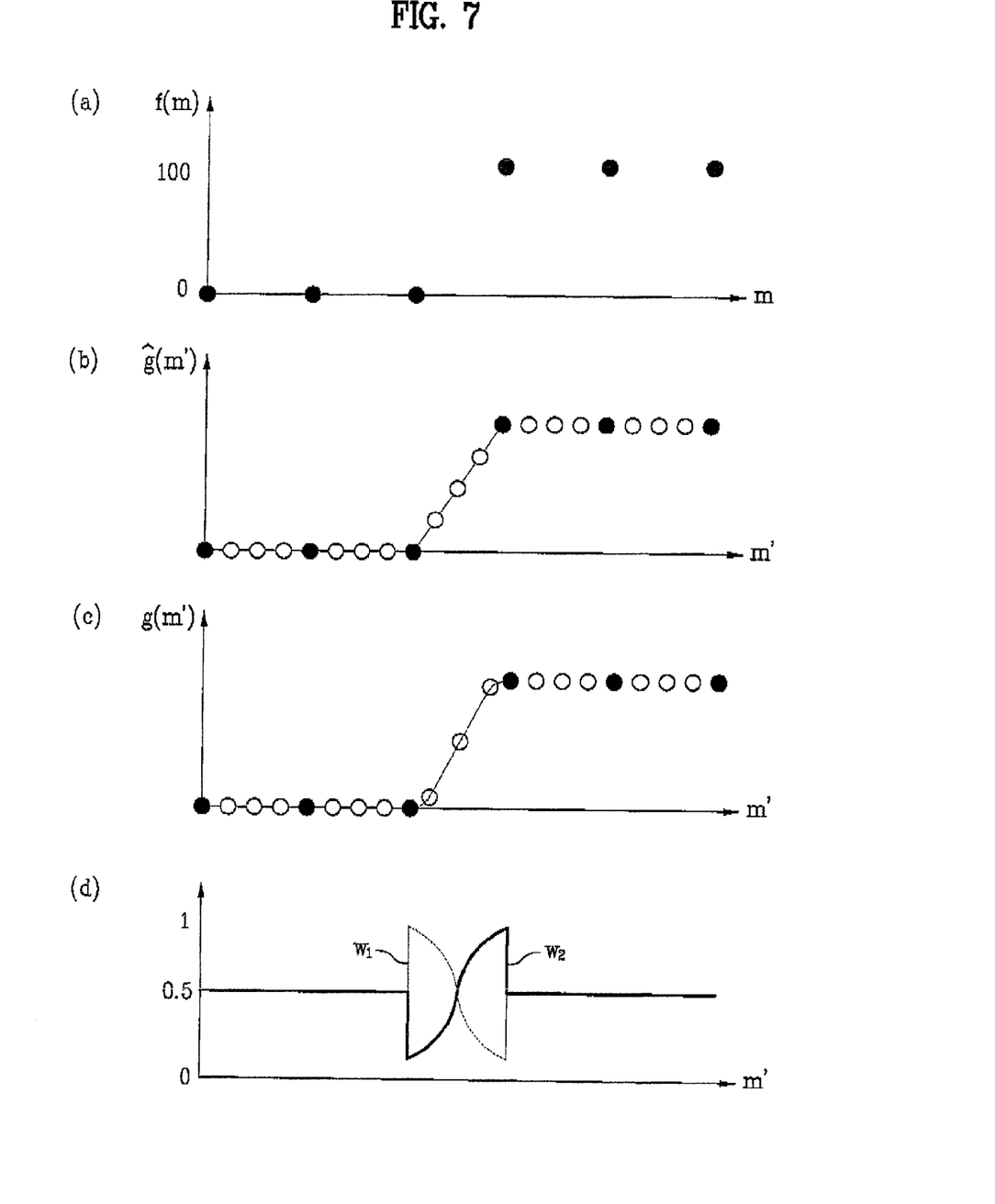
FIG. 7 illustrates graphs of waveforms of the respective units in FIG. 5 in an image interpolating method according to a second embodiment of the present invention.

Effect of the two-stepped interpolation is represented as 1-dimensional signal in FIG. 7.

FIG. 7 illustrates graphs of waveforms of the respective units in FIG. 5 in an image interpolating method according to a second embodiment of the present invention.

FIG. 7(a) shows a graph of a 1-dimensional input signal and FIG. 7(b) shows a four times interpolated result by the linear interpolation in the linear interpolation unit 301.

Referring to FIG. 7(b), a blurring occurs as the weighted value is given in proportion to a distance between an original pixel and a pixel to be interpolated.

FIG. 7(c) shows a final result of the adaptive weighted interpolation in the adaptive weighted interpolation unit 302, in which the blurring is minimized. FIG. 7(d) shows a variation of the weighted value used for the second interpolation, where $w_1$ and $w_2$ denote the weighted values multiplied by left and right samples, respectively.

Accordingly, the image interpolation method and apparatus thereof according to the present invention estimates the edge direction in accordance with the local image characteristic and then carries out interpolation of the input image in a direction of the estimated edge, thereby enabling to minimize a blurring at the edge of the image. Specifically, the present invention carries out interpolation in horizontal and vertical directions, respectively, thereby enabling to construct a circuit freely and use memory and hardware effectively.

Moreover, the present intention caries out sequentially the first step of linear interpolation and the second step of adaptive weighted interpolation, thereby enabling to minimize a blurring at an edge part of the mage, having a strong characteristic against a noise, and attain a sharp interpolated image free from geometrical distortion. Specifically, as the linear interpolation step and the adaptive weighted interpolation step have different and independent structures reciprocally, the present invention enables to construct a corresponding circuit relatively free. And, the present invention requires calculation and cost less than that required by the previous interpolating methods, whereby the product using the present invention has economical cost of product and excellent quality of interpolated image so as to improve its competitiveness.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An image interpolating method comprising:
   a step (a) of searching an edge direction to be used for interpolation by a pixel matching using input pixels; and
   a step (b) of generating a pixel to be substantially interpolated by referring to pixels located on the searched edge direction, wherein the step (b) interpolates an input image twice in a vertical direction using the following formula:

$$\hat{f}(m, n') = \begin{cases} f\left(m, \dfrac{n'}{2}\right), \text{ when } n' \text{ is even number} \\ \left[f\left(m+d_x, \dfrac{n'-1}{2}\right) + f\left(m-d_x, \dfrac{n'+1}{2}\right)\right] \Big/ 2, \text{ when } n' \text{ is odd number,} \end{cases}$$

where n is an index representing a location of each pixel before interpolation, and n' is an index representing a location of each pixel interpolated in a vertical direction.

2. The method of claim 1, wherein the step (a) determines the edge direction as 0° direction at a flat region having a less variation of a signal and a texture part having a severe variation of the signal.

3. The method of claim 1, wherein the step (a) measures an error of each of the edge directions using a measurement function and determines a direction having a minimum error value of the errors as a final edge direction.

4. The method of claim 1, wherein the step (a) determines the edge direction (edge_direction) using the following formula:

$$\text{edge\_direction} = \begin{cases} \theta \in \left\{-45°, \overset{arg}{0}, 45°\right\} & \min\{mae_{-45°}, \gamma \times mae_{0°}, mae_{45°}\}, \\ 0°, & \text{otherwise} \end{cases}$$

when $\min\_error < T$, where $\min\_error = \min\{mae_{-45°}, \gamma \times mae_{0°}, mae_{45°}\}$, $T$ is a threshold value, and $0 < \gamma < 1$.

5. The method of claim 1, wherein the step (a) searches the edge direction having a minimum error by matching pixels located at upper and lower lines of a pixel to be interpolated for a vertical interpolation.

6. The method of claim 5, wherein the step (a) outputs a relative horizontal coordinate as a result of a vertical pixel matching in accordance with the searched edge direction.

7. The method of claim 1, wherein the step (a) searches the edge direction having a minimum error by matching pixels located at right and left to a pixel to be interpolated for a horizontal interpolation.

8. The method of claim 7, wherein the step (a) outputs a relative vertical coordinate as a result of a horizontal pixel matching in accordance with the searched edge direction.

9. The method of claim 1, wherein the edge-directed search and interpolation in the steps (a) and (b) are carried out independently in vertical and horizontal directions, respectively.

10. The method of claim 1, wherein when an input image is interpolated into various multiples, and when a crossing location between the extended line along the determined edge direction from the location of the pixel to be substantially interpolated and horizontal (vertical) line in case of vertical (horizontal) interpolation fails to coincide with a location of an original sample, the step (b) comprises the steps of:
    preparing an interpolation pixel in a horizontal direction by referring to a plurality of pixels adjacent to the crossing in the same edge direction; and
    preparing the pixel to be substantially interpolated by referring to the horizontal interpolation pixel.

11. An image interpolating apparatus comprising:
    a vertical interpolation unit searching an edge direction for a vertical direction by a pixel matching using input pixels and carrying out a vertical interpolation filtering in the searched edge direction; and
    a horizontal interpolation unit searching an edge direction for a horizontal direction by the pixel matching using the input pixels and carrying out a horizontal interpolation filtering in the searched edge direction,
    wherein the vertical and horizontal interpolation units have structures independent from each other, the vertical interpolation unit comprising:
    a vertical pixel matching unit determining the edge direction having a minimum error by matching pixels located at upper and lower lines of a pixel to be interpolated using a measurement function and outputting a relative horizontal coordinate as a result of a vertical pixel matching in accordance with the determined edge direction; and
    a vertical interpolation filter unit carrying out an interpolation in a vertical direction using the input pixels, 1-line-delayed pixel, and pixels located at the relative horizontal coordinate of the vertical pixel matching unit.

12. The apparatus of claim 11, the horizontal interpolation unit comprising:
a horizontal pixel matching unit determining the edge direction having a minimum error by matching pixels located at right and left to a pixel to be interpolated using a measurement function and outputting a relative vertical coordinate as a result of a horizontal pixel matching in accordance with the determined edge direction; and
a horizontal interpolation filter unit carrying out an interpolation in a horizontal direction using the input pixels, a plurality of pixels delayed sequentially by line units respectively through a plurality of line memories, and pixels located at the relative vertical coordinate of the horizontal pixel matching unit.

13. An image interpolating method comprising:
a step (a) of carrying out a first interpolation on input pixels using linear interpolation; and
a step (b) of finding a weighted value coefficient in accordance with a relationship between the first interpolated pixel and the adjacent input pixels to be used for interpolation and preparing a pixel to be substantially interpolated by adaptive weighted interpolation applying the found weighted value coefficient to the adjacent input pixels,
wherein the step (b) carries out the interpolation using the following formula when the first interpolated pixel is distant from a reference pixel as far as $\alpha(\alpha \neq 0)$ in a horizontal direction and $\beta(\beta \neq 0)$ in a vertical direction:

$$g(m',n')=w_{11} \cdot f(m,n)+w_{12} \cdot f(m+1,n)+w_{21} \cdot f)+w_{22} \cdot f(m1,n1),$$

where $w_{11} = \dfrac{C}{\{f(m, n) - \hat{g}(m', n')\}^2 + \varepsilon^2}$, $w_{12} = \dfrac{C}{\{f(m+1, n) - \hat{g}(m', n')\}^2 + \varepsilon^2}$, $w_{21} = \dfrac{C}{\{f(m, n+1) - \hat{g}(m', n')\}^2 + \varepsilon^2}$, $w_{22} = \dfrac{C}{\{f(m+1, n+1) - \hat{g}(m', n')\}^2 + \varepsilon^2}, \varepsilon^2$ 10 relates to a distribution of a noise, C is a normalization constant, f(m,n) is the input pixel located at a left-upper part of the pixel to be interpolated as a reference, f(m+1,n) is the input pixel located at a tight-upper part of the pixel to be interpolated, f(m,n+1) is the input pixel located at a left-lower part of the pixel to be interpolated, f(m+1,n+1) is the input pixel located at a right-lower part of the pixel to be interpolated, and $\hat{g}$(m',n') is a first linearly-interpolated pixel.

14. The method of claim 13, wherein the step (a) carries out the first interpolation on the input pixels using bi-linear interpolation.

15. The method of claim 13, wherein the step (b) carries out interpolation using the following formula when the first interpolated pixel is distant from the input pixel as the reference pixel as far as $\beta(\beta \neq 0)$ in a vertical direction:

$$g(m',n')=w_{11} \cdot f(m,n)+w_{21} \cdot f(m,n+1)$$

where $g(m', n') = w_{11} \cdot f(m, n) + w_{21} \cdot f(m, n + 1)$, where $w_{11} = \dfrac{C}{\{f(m, n) - \hat{g}(m', n')\}^2 + \varepsilon^2}$ and $w_{21} = \dfrac{C}{\{f(m, n+1) - \hat{g}(m', n')\}^2 + \varepsilon^2}$.

16. The method of claim 15, wherein the step (b) carries out the interpolation using the following formula when the first interpolated pixel is distant from the input pixel as the reference pixel as far as $\alpha(\alpha \neq 0)$ in a horizontal direction:

$g(m', n') = w_{11} \cdot f(m, n) + w_{12} \cdot f(m + 1, n)$, where $w_{11} = \dfrac{C}{\{f(m, n) - \hat{g}(m', n')\}^2 + \varepsilon^2}$ and $w_{12} = \dfrac{C}{\{f(m+1, n) - \hat{g}(m', n')\}^2 + \varepsilon^2}$.

17. An image interpolating apparatus comprising:
a linear interpolation unit carrying out a first interpolation on input pixels; and
an adaptive weighted interpolation unit finding a weighted value coefficient in accordance with a relationship between the first interpolated pixel of the linear interpolation unit and the adjacent input pixels used for interpolation and preparing a pixel to be substantially interpolated by adaptive weighted interpolation applying the found weighted value coefficient to the adjacent input pixels,
wherein the step (b) carries out the interpolation using the following formula when the first interpolated pixel is distant from a reference pixel as far as $\alpha(\alpha \neq 0)$ in a horizontal direction and $\beta(\beta \neq 00)$ in a vertical direction:

$$g(m',n')=w_{11} \cdot f(m,n)+w_{12} \cdot f(m+1,n)+w_{21} \cdot f(m,n+1)+w_{22} \cdot f(m+1,n+1)$$

where $w_{11} = \dfrac{C}{\{f(m, n) - \hat{g}(m', n')\}^2 + \varepsilon^2}$, $w_{12} = \dfrac{C}{\{f(m+1, n) - \hat{g}(m', n')\}^2 + \varepsilon^2}$, $w_{21} = \dfrac{C}{\{f(m, n+1) - \hat{g}(m', n')\}^2 + \varepsilon^2}$, $w_{22} = \dfrac{C}{\{f(m+1, n+1) - \hat{g}(m', n')\}^2 + \varepsilon^2}, \varepsilon^2$ 10 relates to a distribution of a noise, C is a normalization constant, f(m,n) is the input pixel located at a left-upper part of the pixel to be interpolated as a reference, f(m+1,n) is the input pixel located at a tight-upper part of the pixel to be interpolated, f(m,n+1) is the input pixel located at a left-lower part of the pixel to be interpolated, f(m+1,n+1) is the input pixel located at a right-lower part of the pixel to be interpolated, and $\hat{g}$(m',n') is a first linearly-interpolated pixel.

* * * * *

UNITED STATES PATENT AND TRADEMARK OFFICE
CERTIFICATE OF CORRECTION

PATENT NO. : 6,987,893 B2
APPLICATION NO. : 10/035252
DATED : January 17, 2006
INVENTOR(S) : Sang Yeon Kim

It is certified that error appears in the above-identified patent and that said Letters Patent is hereby corrected as shown below:

Title page item [30]
Foreign Application Priority Data:

At page 1, column 1 "Jan. 22, 2001" should read -- Jan. 5, 2001--

Signed and Sealed this

Eighteenth Day of July, 2006

JON W. DUDAS
*Director of the United States Patent and Trademark Office*